W. JOHNSON & G. E. SCHOFFSTALL.
AUTOMOBILE RADIATOR TANK.
APPLICATION FILED APR. 27, 1917.
1,301,446.  Patented Apr. 22, 1919.
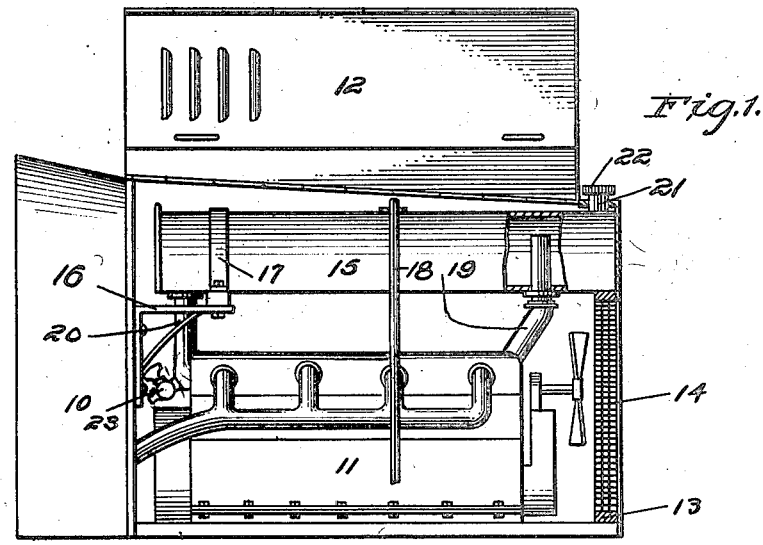
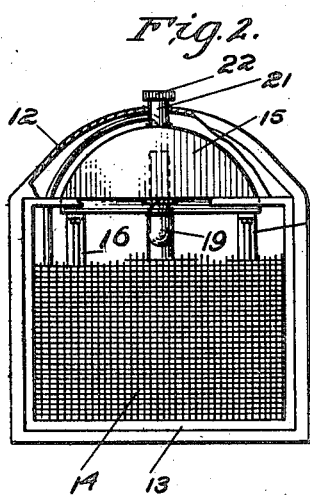
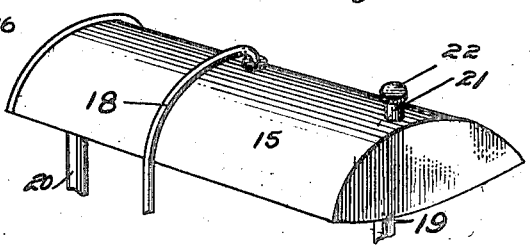
Inventors:
William Johnson
Gurney E. Schoffstall
By Ourig & Bair
Attys.

UNITED STATES PATENT OFFICE.

WILLIAM JOHNSON AND GURNEY E. SCHOFFSTALL, OF PILOT MOUND, IOWA.

AUTOMOBILE RADIATOR-TANK.

1,301,446.

Specification of Letters Patent.   Patented Apr. 22, 1919.

Application filed April 27, 1917.   Serial No. 165,029.

*To all whom it may concern:*

Be it known that we, WILLIAM JOHNSON and GURNEY E. SCHOFFSTALL, citizens of the United States, and residents of Pilot Mound, in the county of Boone and State of Iowa, have invented a certain new and useful Automobile Radiator-Tank, of which the following is a specification.

The object of our invention is to provide an automobile radiator tank of simple, durable and inexpensive construction.

A further object is to provide the combination of an automobile engine with a radiator tank therefor, adapted to be connected up with the engine after the ordinary radiator has been disconnected and removed, and to be supported in different positions to meet the ordinary hood, for causing less cooling of the water jacket during cold weather.

With these and other objects in view our invention consists in the construction, arrangement and combination of the various parts of the device, whereby the objects contemplated are attained, as hereinafter more fully set forth, pointed out in our claim, and illustrated in the accompanying drawings, in which:

Figure 1 shows a side elevation partly in section of an automobile engine equipped with our improved tank the hood of the automobile being shown partially raised.

Fig. 2 shows a front view of the same, partially cut away and partly in section, and Fig. 3 shows a perspective view of the tank.

In the accompanying drawings, we have used the reference numeral 10 to indicate generally a part of the body of an automobile, at the front end of which is mounted the engine 11, which is covered by the ordinary hinged hood 12.

In the use of our improved tank, we disconnect and remove the ordinary radiator, and substitute therefor our tank, and a frame 13 supports a grille work 14.

The grille work is arranged in front of the engine for filling part of the space ordinarily occupied by the radiator, but somewhat shorter from top to bottom than the radiator.

Our improved tank 15 preferably has a bottom with suitable end members and a curved top. The entire device has generally the form of a part of a cylinder, as shown clearly in Fig. 3.

The forward end of the tank 15 rests on the upper portion of the frame 13, as shown in Fig. 1, and the rear end is supported on brackets 16, which are preferably connected by a band or the like 17 which firmly engages the tank.

Communicating with the upper portion of the tank is an overflow tube 18. A feed tube 19 is extended through the bottom of the tank to position near the upper portion thereof, as shown in Fig. 1, and is arranged to communicate with the upper portion of the water jacket of the engine 11. A second tube 20 communicates with the lower part of the tank and with the water jacket, and has at its lower end a drain cock 23.

It is within the contemplation of our invention to make the tank 15 in different shapes and sizes and also to locate it at different places with relation to the engine. We preferably, however, locate the tank directly above the engine within the hood of the machine.

An intake pipe 21 communicates with the upper part of the tank and is provided with a detachable cover member 22. The pipe 21 may be used for supplying water to the tank 15.

The use of a tank of this kind for a substitute of an ordinary radiator has a large number of advantages, some of which may be seen from the foregoing description.

The water is kept in solid volume, and is not subjected in small quantities to the cooling action of the air during the winter.

We shall be enabled by the means of our tank to prevent too great cooling of the engine during its use in cold winter months.

It will be noted that our tank is within the hood of the automobile, so that the heat thereof may be retained under the hood and the tank is thus not directly subjected to contact with outside air.

It is our intention to cover by the claim of the patent to be issued upon this application any modified forms of structure or use of mechanical equivalents, which may be reasonably included within the scope of our claim.

We claim as our invention.

In a device of the class described, the combination of an automobile frame and an engine thereon having a water jacket, and a hinged hood, with a comparatively shallow cooling tank supported beneath the hood above the engine, means for connecting said tank and said water jacket, a grid mounted on the frame in front of the engine after the removal of the ordinary radiator, to support the forward end of said tank, said tank having its forward end projected beyond said hood adapted to support the front end of the hood and provided with an inlet pipe adapted to limit the forward movement of the hood.

Des Moines, Iowa, April 5, 1917.

WILLIAM JOHNSON.
GURNEY E. SCHOFFSTALL.